stant Examiner

United States Patent [19]
Yamamoto et al.

[11] 4,036,766
[45] July 19, 1977

[54] POLYMETHACRYLATE ADDITIVES AND LUBE COMPOSITIONS THEREOF

[75] Inventors: Roy I. Yamamoto, Wappingers Falls; Abraham Morduchowitz, Monsey, both of N.Y.; Wheeler C. Crawford, Houston, Tex.; Carmen M. Cusano, Poughkeepsie, N.Y.

[73] Assignee: Texaco Inc., New York, N.Y.

[21] Appl. No.: 696,150

[22] Filed: June 14, 1976

[51] Int. Cl.$^2$ ............................................. C10M 1/32
[52] U.S. Cl. ........................ 252/51.5 A; 252/51.5 R; 260/33.6 UA; 260/878 R
[58] Field of Search ............... 252/51.5 R, 51.5 A; 260/33.6 UA, 878 R

[56] References Cited

U.S. PATENT DOCUMENTS

| | | | |
|---|---|---|---|
| 2,737,496 | 3/1956 | Catlin | 252/51.5 A |
| 2,892,785 | 6/1959 | Harle et al. | 252/51.5 A X |
| 2,892,790 | 6/1959 | Stuart et al. | 252/51.5 A X |
| 3,445,387 | 5/1969 | Liston | 252/51.5 R X |
| 3,657,392 | 4/1972 | Daniels et al. | 260/33.6 UA X |
| 3,816,314 | 6/1974 | Pappas et al. | 252/51.5 A |
| 3,816,315 | 6/1974 | Morduchowitz et al. | 252/51.5 A |
| 3,856,689 | 12/1974 | Hoke | 252/51.5 A |
| 3,879,304 | 4/1975 | Waldbillig | 252/51.5 A |
| 3,892,671 | 7/1975 | Song et al. | 252/51.5 A |

Primary Examiner—Delbert E. Gantz
Assistant Examiner—Andrew H. Metz
Attorney, Agent, or Firm—Thomas H. Whaley; Carl G. Ries; Robert A. Kulason

[57] ABSTRACT

A complex product of 1). an interpolymer of dialkylaminoalkyl methacrylate, $C_1$–$C_6$ alkyl methacrylate, $C_{10}$–$C_{14}$ alkyl methacrylate and $C_{16}$–$C_{20}$ alkyl methacrylate monomers and 2). a liquid poly(alkene-1) of a molecular weight between about 200 and 10,000 prepared by polymerizing the monomers comprising said interpolymer in the presence of said liquid poly(alkene-1). A mineral oil composition of improved viscosity, pour depressing and detergent-dispersant properties and concentrates thereof comprising between about 10 and 95 wt. % of a mineral oil of a lubricating viscosity and between about 0.1 and 90 wt. % of said complex product.

8 Claims, No Drawings

POLYMETHACRYLATE ADDITIVES AND LUBE COMPOSITIONS THEREOF

BACKGROUND OF INVENTION

Polymeric additives derived from acrylic and methacrylic acids are extensively used in mineral lubricating oil compositions, particularly in automatic transmission fluids and crankcase oils, to impart desirable viscosity-temperature characteristics to the compositions. These additives are designed to modify lubricating oil so that changes in viscosity occurring with variations in temperature are kept as small as possible. Lubricating oils containing such polymeric additives essentially maintain their viscosity at the high temperatures normally encountered in engine and transmission operations while at the same time maintaining a desirably low viscosity fluidity at engine starting temperatures. The ability of the hydrocarbon oil to accommodate increased and decreased temperatures with a minimum change in viscosity is indicated by its Viscosity Index (VI). The greater this ability the higher the VI. Because of the aforementioned properties, these polymeric additives have been conveniently termed both "thickeners" and "VI improvers".

The increasing demands made by the present day engines and automatic transmissions due to increased antipollution and peformance requirements have created a need for crankcase and automatic transmission fluid additives which have multifunctional properties in order to prevent a build-up of such large quantities of additives required to meet the specification as to pose a danger of a quantity so large as to negatively effect the primary mission of the crankcase oil or transmission fluid. One class of additives that meets this requirement are the dialkylaminoalkyl-, $C_1$–$C_6$ alkyl-, $C_{10}$–$C_{14}$ alkyl-, $C_{16}$–$C_{20}$ alkyl methacrylate interpolymers of a molecular weight of between about $5 \times 10^4$ and $10^6$. These polymthacrylates not only provide improved VI properties to crankcase and transmission oils, but also have the properties of imparting improved dispersancy, low temperature fluidity and antioxidant properties thereto. The component which principally contributes to the improved detergent and antioxidant properties is the dialkylaminoalkyl methacryate, the improvement generally in a proportional relationship with the amino methacrylate content. Since this particular component is relatively costly, there is a continuing search to improve the dispersant and antioxidant properties of these dialkylaminoalkyl containing polymers without increasing the dialkylaminoalkyl methacrylate content or alternatively producing an interpolymer in which the dialkylaminoalkyl methacrylate content can be reduced without an equivalent reduction in detergent and antioxidant properties.

SUMMARY OF INVENTION

We have discovered and this constitutes our invention a complex reaction product of an interpolymer of dialkylaminoalkyl methacrylate, $C_1$–$C_6$ alkyl methacrylate, $C_{10}$–$C_{14}$ alkyl methacryate, and $C_{16}$–$C_{20}$ alkyl methacrylate, and a liquid poly(alkene-1) of a molecular weight of between about 200 and 10,000 wherein the alkene-1 monomer is of from 3 to 12 carbons, prepared by polymerizing the monomeric components of the interpolymer in the presence of said poly(alkene-1) which not only results in a product of good VI improving properties but also a product which has improved dispersant and antioxidant properties when incorporated in automatic transmission and crankcase fluids for a given nitrogen content.

Within the scope of our invention there is also included finished mineral oil compositions containing as a major component (~75 to 95 wt. %) mineral oil of a lubricating oil viscosity and between about 0.1 and 10 wt. % of the polymethacrylate-poly(alkene-1) complex the remainder supplementary additives, as well as concentrates thereof containing 10 to 90 wt. % of the complex and 10 to 90 wt. % mineral oil. Concentrates are formed for the purpose of storage and handling and are blended with additional mineral oil to form the finished compositions suitable for use.

DETAILED DESCRIPTION OF THE INVENTION

More specifically, the interpolymeric polymethacrylate-poly(1-alkene) components in the complex reaction product are present in a weight ratio of polymethacrylate:poly(1-alkene) of between about 4:1 and 2:3. The monomers composing the interpolymer are as follows:

1. Dialkylaminoalkyl methacrylate characterized by the formula:

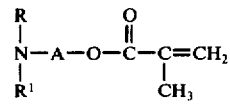

where R and $R^1$ are alkyl of from 1 to 2 carbons and A is a saturated aliphatic hydrocarbon (alkanediyl) of from 1 to 5 carbons.

2. $C_1$–$C_6$ alkyl methacrylate of the formula:

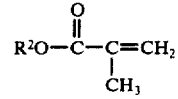

where $R^2$ is alkyl of from 1 to 6 carbons.

3. $C_{10}$–$C_{14}$ alkyl methacrylate of the formula:

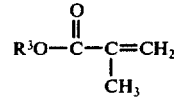

where $R^3$ is alkyl of from 10 to 14 carbons and

4. $C_{16}$–$C_{20}$ alkyl methacrylate of the formula:

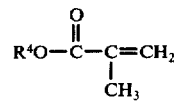

where $R^4$ is alkyl of from 16 to 20 carbons, said interpolymer having an intrinsic viscosity in benzene at 77° of between about 0.1 and 2.5, preferably between about 0.3 and 0.8, a molecular weight (membrane osmometry) of between about 50,000 and $10^6$, preferably between about $10^5$ and $3 \times 10^5$ said interpolymer consisting of between about 1 and 10 wt. % of said dialkylaminoalkyl methacrylate, between about 15 and 30 wt. % of said $C_1$-$C_6$ alkyl methacrylate, betwen about 40 and 60 wt. % of said $C_{10}$-$C_{14}$ alkyl methacrylate and between about 15 and 30 wt. % of said $C_{16}$-$C_{20}$ alkyl methacrylate.

As heretofore stated, the liquid poly($C_3$ to $C_{12}$ alkene-1) of a molecular weight of betwen about 200 (vapor pressure osmometry) and 10,000 (membrane osmometry) is derived from an alkene-1 of from 3 to 12 carbons such as propylene-1, hexene-1, octene-1, decene-1 and dodecene and it is employed as the reaction solvent in which polymerization ofthe aforementioned alkyl methacrylates is undertaken.

The polymethacrylate-poly(1-alkene) complex reaction product is prepared by standard polymerization techniques with the exception that polymerization of the methacrylate monomers takes place in the presence of the liquid polyalkene as defined in a weight ratio of total methacrylate monomers to polyalkene of between about 4:1 and 2:3, preferably about 2:1. More particularly, the alkyl methacryate monomers and the liquid polyolefin reaction solvent are charged to a reaction vessel in an individual quantity component amount equal to the component ratios desired in the final complex product. Polymerization is conducted at a temperature of between about 50 and 100° C. in the presence of between about 0.05 and 0.4 wt. % of a standard polymerization catalyst such as azobisisobutyronitrile and between about 0.01 and 0.2 wt. % based on the reaction mixture of a standard chain transfer agent such as lauryl mercaptan. Polymerization is continued until all the monomers are consumed, normally measured in terms of refractive index. If the desired degree of polymerization is not attained, additional polymerization catalyst in the aforementioned quantitites can be added. Advantageously, polymerization is conducted under agitated conditions in the presence of an inert atmosphere such as nitrogen utilizing multiple catalyst addition, e.g., 2 to 5 additions. Under further advantageous conditions, diluent oil may be added during the second or later dose of polymerization catalyst, normally in an amount of between about 0 and 250 wt. % of the reaction mixture. It is to be noted that the termination of polymerization is signified in a particular catalyst addition phase by the refractive index remaining essentially constant.

The exact mechanism by which the improved dispersancy and oxidative stability is achieved by the complex has yet to be determined. However, it is theorized the liquid polyalkene reaction solvent becomes "associated" with the polymethacrylate to increase the solubility of the polymethacrylate in the oil which allows more oxidized materials and particles to be suspended therein. Such a solvent effect could also be described in terms of a "complex" formed between the polymer and polymerization solvent or in terms of the polymerization solvent as a cosolvent for the polymer and diluent mineral oil.

In preparation of the aforedescribed interpolymer of the complex, specific examples of the dialkylaminoalkyl methacrylate contemplated herein are N,N-dimethylaminoethyl methacrylate, N,N-diethylaminoethyl methacrylate, N,N-dimethylaminopropyl methacrylate and N,N-diethylaminopropyl methacrylate, and mixtures thereof.

Specific examples of the $C_1$-$C_6$ alkyl methacrylte are methyl methacrylate, butyl methacrylate, hexyl methacrylate and mixtures thereof.

Examples of the $C_{10}$-$C_{14}$ alkyl methacrylates are decyl methacrylte, undecyl methacrylate, dodecyl methacrylate, tridecyl methacrylate, tetradecyl methacrylate and mixtures of alkyl methacrylates falling essentially within the defined alkyl carbon range.

Specific examples of the $C_{16}$-$C_{20}$ alkyl methacrylates contemplated herein are hexadecyl methacrylate, heptadecyl methacrylate, octadecyl methacrylate, nonadecyl methacrylate, eicosyl methacrylate and mixtures thereof.

In respect to the above, mixtures of alkyl methacrylate monomers are found when commercial alcohols are used in the monomer manufacture since many commercial alcohols are in actuality a mixture of adjacent and closely adjacent homologs with one or two carbon chain lengths predominting.

Examples of the reaction solvents contemplated are polypropylene of an average molecular weight (m.w.) of about 800 (osmometer) poly(decene-1) of an m.w. of about 580, poly(hexene-1) of a 5000 m.w., poly(octene-1) of a 1000 m.w. and poly(dodecene-1) of an 1800 m.w.

The mineral hydrocarbon oils of lubricating viscosity contemplated for optional use in the preparation of the polymethacrylate-polyalkene complex products as well as in mineral lubricating oil compositions containing said products can be derived from a wide variety of hydrocarbon base oils such as naphthenic base, paraffinic base and mixed based mineral oils, e.g. having an SUS viscosity at 100° F. of between about 35 and 1000.

When the finished lubricant compositions are to be employed as autmotic transmission fluids, the complex product content is desirably between about 1.25 and 2.25 wt. % and the mineral lubricating oil base is desirably present in an amount between about 85 and 95 wt. %%, advantageously having an SUS viscosity between about 40 and 150 SUS at 100° F., preferably between about 50 and 125, the remainder of the transmission fluid composition being composed of standard additives normally found therein. These additional additives are normally supplementary detergent-dispersants, antirust-corrosion inhibitors, supplemental antioxidants and friction modifiers. Examples of such supplementary additives are set forth in U.S. Pat. No. 3,640,872, for example, detergent-dispersants such as the alkenyl substituted succinic anhydride derivative of polyethylene polyamine, e.g. where the alkenyl group is a polybutene of a molecular weight of about 1200, the amine is hexamethylene pentamine; and antioxidants such as phenylnaphthyl amine, phenylenediamine, phenothiazine, diphenylamine; friction modifiers such as modified carboxylic acid, e.g. N-acyl sarcosine compound represented by the formula:

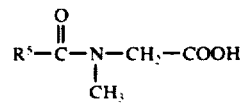

where $R^5$ is an aliphatic radical having from 12 to 70 carbons; antirust and anticorrosive agents such as a mixture of hydrolyzed $C_6$-$C_{18}$ alkenyl succinic anhydride, phenol, mono- and di-$C_{12}$ alkyl phosphoric acid esters; and friction modifier life extenders such as zinc di(alkylphenoxypolyalkoxyalkyl) dithiophosphates.

The finsihed lubricating oil compositions contemplated herein which are particularly suitable for use as crankcase lubricants in internal combustion engines would genrally comprise between about 75 and 95 wt. % of a hydrocarbon lubricating base oil, preferably of an SUS viscosity between about 95 and 150 at 100° F.

and between 0.1 and 10 wt. % of the complex product, the remainder of the engine oil compositions being composed of standard lube oil additives for engines, these additional additives are found in the classes of supplementary detergents, supplementary oxidation inhibitors, corrosion inhibitors and antifoamants, etc.

Some examples of the supplementary detergent dispersants contemplated herein are ethylene oxide derivatives of inorgaic phosphorus acid free, steam hydrolyzed, polybutylene (700–5000 m.w.)-$P_2S_5$ reaction product, overbased calcium akyl aromatic sultonates having a total base number of at least about 300 and sulfurized normal calcium alkylphenolate. These supplementary detergent dispersants are disclosed in U.S. Pat. Nos. 3,087,956, 3,549,534 and 3,537,966.

Examples of suitable engine oil supplementary antioxidants contemplated herein are zinc and cadmium dialkyldithiophosphate and diaryldithiophosphate, the alkylated diphenylamines, sulfurized diphenylamines, unsulfurized and sulfurized alkylphenols and phenolates and hindered phenols.

Examples of suitble engine oil corrosion inhibitors are zinc dialkyldithiophosphate, zinc diaryldithiophosphate, basic calcium and magnesium sulfonates; calcium, barium and magnesium phenolates.

The following examples further illustrate the complex products of the invention and the compositions thereof but are not to be construed as limitations thereof.

EXAMPLE I

To a 4-liter resin kettle equipped with a nitrogen inlet tube, stirrer, heater, cooling fan, thermistor and thermocouple, the following materials were charged:

| Materials | Grams |
| --- | --- |
| Dimethylaminoethyl methacrylate (DMAEMA) | 10 |
| Butyl methacrylate (BMA) | 240 |
| Neodol 25L* methacrylate (NMA) | 575 |
| Alfol 1620 SP** methacrylate (AMA) | 175 |
| Poly(decene-1) (580 m.w.) | 500 |
| Dodecylmercaptan | 0.5 |

The reaction mixture was purged with nitrogen for a period of one-third hour with stirring and then heated to 83° C. and 2 grams of azobisisobutyronitrile (AIBN) polymerization catalyst were added. Samples of the reaction mixture were periodically withdrawn at one-half hour intervals and refractive index $N_d 54°C$ readings were taken. When the refractive index became constant which was after about 3 hours, 0.75 gram of additional AIBN was added together with 1130 grams of mineral oil of an SUS viscosity of 41 at 100° F. and stirring was continued at about 83° C. kettle temperature. After an additional hour of stirring another 0.7 gram of AIBN was added and reaction conditions were maintained for one more hour. Then the temperature was raised to 100° C. for a 1 hour period. The complex product was characterized as a 57 wt. % lube oil solution of a dimethylaminoethyl methacrylate (DMAEMA), butyl methacrylate (BMA), Neodol 25L methacrylate (NMA) and Alfol 1620 SP methacrylate (AMA) interpolymer in complex with poly(decene-1), said complex product having a weight ratio of interpolymer:poly(decene-1) of 2:1, said interpolymer component having a molecular weight of approximately $1.8 \times 10^5$.

The NMA and AMA monomers described above are resspectively derived from Neodol 25L* and Alfol 1620 SP** which are tradenames for technical grade alkanols respectively of Shell Chemical Co. and Continental Oil Co. having the following typical analysis:

| | Typical Properties Approx. homolog Distribution, wt. % |
| --- | --- |
| Neodol 25L* (Synthetic Lauryl Alcohol) | |
| Lighter than $C_{12}OH$ | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| Alfol 1620 SP** (Synthetic stearyl alcohol) | |
| $C_{14}OH$ and lighter | 4 |
| $C_{16}OH$ | 55 |
| $C_{18}OH$ | 27 |
| $C_{20}OH$ | 9 |

The resultant alkyl methacrylate monomers derived from the reaction of methacrylic acid with these alcohols are in essence a mixture of $C_{12}$ to $C_{16}$ alkyl methacrylates for those derived from Neodol 25L and $C_{16}$ to $C_{20}$ alkyl methacrylates for those derived from Alfol 1620 SP with the same weight percent distribution for a specific alkyl methacrylate as is found in the alcohol mixture. This same weight distribution of the $C_{12}$ to $C_{16}$ and $C_{16}$ to $C_{20}$ methacrylate will also carry over into the interpolymer.

Analysis of the poly(decene-1) reaction solvent found the following:

| Tests | Results |
| --- | --- |
| Sp. Grav., 60°/60° F. | 0.8331 |
| Pour Point, ° F. | −60 |
| Kin. Visc., cs. | |
| at 100° F. | 45.2 |
| at 210° F. | 8.19 |
| Flash, COC, ° F. | 440 |
| Bromine No. | 9.1 |
| Molecular wt. (Vapor Phase Osmometry) | 580 |

EXAMPLE II

Using the same equipment described in Example I, the following materials were charged:

| Materials | Grams |
| --- | --- |
| DMAEMA | 40 |
| BMA | 210 |
| NMA | 575 |
| AMA | 175 |
| Polypropylene (m.w. 800) | 500 |
| Dodecyl mercaptan | 0.5 |

The reaction mixture was purged with nitrogen for a period of one-third hour with stirring and then heated to 83° C. and 2.0 grams of AIBN were added. After the $N_d 54°$ C(refractive index)became constant, 0.5 gram AIBN was added together with 1130 grams of mineral oil of an SUS viscosity of 41 at 100° F. Stirring was continued for one hour at 83° C. and then another hour at 100° C. The product was characterized as a 57 wt. % lube oil solution of a 4:21:57.5:17.5 weight ratio DMAEMA:BMA: NMA:AMA polymethacrylate interpolymer in complex with polypropylene (800 m.w.), said complex having a weight ratio of interpolymer:polypropylene of 2:1, said interpolymer component having a molecular weight of approximately $1.8 \times 10^5$.

EXAMPLE III

Using the same equipment described in Example I, the following materials were charged:

| Materials | Grams |
| --- | --- |
| DMAEMA | 40 |
| BMA | 210 |
| NMA | 575 |
| AMA | 175 |
| POlypropylene (m.w. ~800) | 500 |
| Dodecyl mercaptan | 0.55 |

The reaction mixture was purged with nitrogen for a period of one-third hour with stirring and then heated to 83° C. and 2.0 grams of AIBN were added. After the $N_d$ 54° C (refractive index) became constant, 0.5 gram AIBN was added together with 940 grams of a mineral oil of an SUS viscosity of 102 at 100° F. Stirring was continued for one hour at 83° C. and then another hour at 100° C. The product formed was characterized as a 61 wt. % lube oil solution of a 4:21:57.5:17.5 weight ratio DMAEMA:BMA:NMA:AMA polymethacrylate interpolymer in complex with polypropylene (~800 m.w.), said complex having a weight ratio of interpolymer component to polypropylene of 2:1, said interpolymer component having a molecular weight of approximately $1.8 \times 10^5$.

EXAMPLE IV

This example illustrates the superiority of the complex VI improver products of the invention in respect to antioxidant and dispersant properties.

Two automatic transmission fluids (ATF) were prepared, representative fluid "A" to which was added the lube oil solution of the complex polymethacrylate-polydecene product described in Example I (Improver A) and comparative fluid "B" to which was added a lube oil solution of a comparative interpolymer prepared under the conditions of Example I with the exception that mineral oil was substituted for polydecene and the quantities of monomers were adjusted to give a DMAEMA:BMA:NMA:AMA of a component weight ratio of 4:21:50:25 (Improver B). The molecular weights of the representative and comparative polymethacrylate "B" interpolymer components were essentially equivalent.

Two test formulations are described below:

| COMPOSITIONS OF TEST BLENDS | | |
| --- | --- | --- |
| Composition, Vol. % | "A" | "B" |
| Mineral Oil (~100 SUS at 100° F.) | 89.2 | 89.9 |
| ATF Additive Mix* | 5.0 | 5.0 |
| Aromatic Distillate from Gas Oil | 1.0 | 1.0 |
| Red Dye, ppm | 128 | 128 |
| Polymethacrylate VI Improver | 4.8** | 4.8*** |

*47 wt. % Boron/polyalkenylsuccinimide reaction product, 8 wt. % zinc methylisobutylcarbinol dithiophosphate, 3 wt. % phenyl-α-naphthylamine, 42 wt. % mineral oil.
**38 wt. % neat polymethacrylate component in polydecene-mineral oil.
***41 wt. % neat polymethacrylate in mineral oil.

The above formulations were tested in Mercomatic Oxidation Test which is described in Automatic Transmission Fluid Specification M 2C33G of the Ford Motor Company and measures oxidation stability among other things. The test data are reported below in the following table:

| MERC-O-MATIC OXIDATION TEST DATA WITH POLYMER | | |
| --- | --- | --- |
| Terminal Data | A | B |
| Test Hours | 300 | 283 |
| Kin. Vis., cs, 100° F. | 64.3 | 78.1 |
| 210° F. | 11.96 | 13.19 |
| Total Acid No. (TAN) | 6.46 | 7.70 |
| Neut. No. | 5.90 | 6.47 |
| Inspection Data | | |
| Varnish Rating 50 = clean) | 49.0 | 45.5 |
| Sludge Rating (50 = clean) | 46.0 | 47.4 |
| Total Ford Rating (100 = clean) | 95.0 | 92.9 |

As can be seen from the foregoing in Test Run A, Composition A containing the representative methacrylate-polydecene complex of the invention has substantially superior antioxidant properties than Composition B utilizing the comparative polymethacrylate prepared in oil. This is emphasized by the fact that Test Run A was run under more severe circumstances, i.e., 300 hours as opposed to 283 hours for Test Run B. Further, more polymethacrylate component was employed in Run B and the polymethacrylate in "B" contained four times as much antioxidant contributing aminomethacrylate component as did Run "A".

EXAMPLE V

This example further illustrates the superior oxidation stability and dispersancy of the complex polymethacrylate-polyalkene VI improvers of the invention and further demonstrates that this enhancement of oxidative stability and dispersancy cannot be achieved by a mere physical mixture of polymethacrylate and liquid polyalkene.

Three fully formulated automatic transmission fluids C, D and E were tested in the Ford Aluminum Beaker Test which measures antioxidant properties and dispersancy Fluids C, D, and E are essentially identical differing only in polymethacrylate VI improver. Representative VI improver (C) in representative formulation C was the lube oil solution of the 1:24:57.5:17.5 weight ratio of DMAEMA:BMA:NMA:AMA polymethacrylate-polydecene complex of Example I. Comparative polymethacrylate (D), 4:21:50:25 DMAEMA:BMA:NMA:AMA weight ratio polymethacryate, is described in Example IV. Comparative VI improver (E) utilized in comparative fluid (E) was prepared utilizing the procedure of Example I with the exception that polymerization of the methacrylate monomers was conducted in the presence of a mineral lubricating oil rather than polydecene and only after polymerization ceased was polydecene added to the final reaction product to produce a physical mixture as opposed to the comparative complex having a 1:24:57.5:17.5 weight ratio DMAEMA:BMA:NMA:AMA polymethacrylate:polydecene weight ratio of 2:1. The molecular weight of the three neat polymethacrylate components were essentially the same.

The Ford Aluminum Beaker Test is described in the Ford Motor Company Applied Research Report ARM 65-19 of Sept. 15, 1965, also in Society of Automotive Engineer's Paper No. 670023 of January 1967.

The test data and results are reported below:

FORD ALUMINUM BEAKER TEST RESULTS SHOWING THAT POLY (DECENE-1) MUST BE USED AS THE POLYMERIZATION SOLVENT RATHER THAN AS A DILUENT TO BENEFIT FROM THE ENHANCED DISPERSANCY

| Composition of Fluid, Wt. % | C | D | E |
|---|---|---|---|
| Mineral Oil (~100 SUS at 100° F.) | 89.5 | 89.5 | 89.5 |
| ATF Additive Mixture* | 5.5 | 5.5 | 5.5 |
| Red Dye, ppm | 128 | 128 | 128 |
| Polymethacrylate V. I. Improver | 5.0(C)** | 5.0(D)** | 5.0(E)** |
| Ford Aluminum Beaker Test Data (304 Hrs.) | | | |
| Rating | 8.6 | 8.7 | 7.3 |
| Kin. Vis., c.s. 100° F. | 99.0 | 299.4 | 109.0 |
| 210° F. | 18.86 | 47.5 | 20.8 |
| TAN | 6.12 | 6.68 | 6.46 |
| % Pentane Insolubles | 0.22 | 0.60 | 0.36 |

*47 wt. % Boron/polyalkenylsuccinimide reaction product, 8 wt. % zinc methylisobutylcarbinol dithiophosphate, 3 wt. % phenyl-α-naphthylamine, 42 wt. % mineral oil.
**(C) = 38 wt. % neat polymethacrylate in oil-polydecene mixture.
(D) = 41 wt. % neat polymethacrylate in oil.
(E) 57 wt. % polymethacrylate-polydecene complex in oil.

As can be seen by the foregoing by reference to the "Rating" and "TAN" values, for equivalent DMAEMA content representative interpolymer (C)-poly(-decene-1) complex is substantially more effective detergent dispersant and antioxidant than comparative interpolymers (D) and (E).

EXAMPLE VI

This example illustrates the improved oxidative stability and dispersancy for the polymethacrylate-polyalkene VI improvers of the invention.

Three polymethacrylate VI improvers were tested in the Turbohydramatic Oxidation Test. This test is described in Dexron II Automatic Transmission Fluid Specification GM 6137-M, July 1973, of the General Motors Corp.

The VI improvers tested were representive complex polymethacrylate interpolymer-polypropylene of Example II designated herein as "F" and comparative Polymethacrylate G. Polymethacrylate G was prepared in accordance with Example II with the exception that the polypropylene reaction solvent was substituted with diluent mineral oil of an SUS viscosity of 143 at 100° F. and comparative Polymethacrylate H is comparative Polymethacrylate G diluted with liquid polypropylene described in Example II in a weight ratio of neat polymethacrylate to polypropylene of about 2:1. The molecular weights of the three neat polymethacrylate components tested were essentially the same.

Three fully formulated automatic transmission fluids were subjected to the aforedescribed test and were identical to one another with the exception in the variation of the polymethacrylate VI improvers therein, namely, representative Improver F and comparative Improvers G and H. The fully formulated test formulations are described below:

| Description | ATF Test Formulation | | |
|---|---|---|---|
| | F | G | H |
| Composition, Vol. % | | | |
| Mineral Oil (100 SUS at 100° F.) | 88.8 | 88.8 | 88.8 |
| ATF Additive Mixture | 8.0 | 8.0 | 8.0 |
| Red Dye, ppm | 128 | 128 | 128 |
| Polymethacrylate | 3.2* | 3.2** | 3.2*** |

-continued

| Description | ATF Test Formulation | | |
|---|---|---|---|
| | F | G | H |
| VI Improver | | | |

*57 wt. % lube oil solution of 4:21:57.5:17.5 weight ratio DMAEMA:BMA:N-MA:AMA polymethacrylate-polypropylene complex wherein the weight ratio of polymethacrylate:polypropylene is 2:1 (38 wt. % polymethacrylate on neat basis).
**38 wt. % lube oil solution of 4:21:57.5:17.5 weight ratio DMAEMA:BMA:N-MA:AMA (38 wt. % polymethacrylate on a neat basis).
***57 wt. % lube oil solution of 4:21:57.5:17.5 weight ratio DMAEMA:BMA:N-MA:AMA in physical mixture with polypropylene in a 2:1 weight ratio (38 wt. % polymethacrylate on a neat basis).

The above ATF fluids in the results of the Turbohydramatic Test are reported below:

TURBOHYDRAMATIC OXIDATION TEST DATA

| ATF Fluid | Sludge 100 rating | Varnish = clean | % Fill in Forward Clutch Drum | % Visc. Inc. | Inc. TAN |
|---|---|---|---|---|---|
| F | 98 | 99 | 0 | 10 | 4.9 |
| G | 80 | 89 | 24 | 17 | 8.0 |
| H | 92 | 98 | 7 | 45 | 5.0 |

As can be seen from the above, the polymethacrylate prepared in polypropylene reaction solvent produced an ATF fluid which has a higher sludge and varnish rating and lower TAN, viscosity increase and "Fill In" than ATF fluid containing comparative polymethacrylates which demonstrates the VI improvers of the invention demonstrated by Fluid F have more effective antioxidant and dispersant properties than the comparative improvers in Fluids G and H. Data from Run H shows that the polyalkene as defined must be used as the polymerization solvent in order to obtain maximum benefits.

EXAMPLE VII

This example further illustrates the improved oxidative stability for the polymethacrylate VI improvers of the invention.

The VI improvers tested were the representative 4:21:57.5:17.5 weight ratio DMAEMA:BMA:N-MA:AMA polymethacrylate-polypropylene complex product of Example II designated as Improver J and the comparative 4:21:57.5:17.5 DMAEMA:BMA:N-MA:AMA polymethacrylate of equivalent molecular weight prepared in accordance with Example II with the exception polymerization was conducted in the presence of mineral oil rather than polypropylene. The comparative improver was designated as Improver K.

Two fully formulated ATF fluids were prepared respectively containing Improvers J and K and are described below:

| Description | J | K |
|---|---|---|
| Composition, vol. % | | |
| Mineral Oil (100 SUS at 100° F.) | 91.8 | 91.8 |
| ATF Additive Package | 5.0 | 5.0 |
| Red Dye ppm | 128 | 128 |
| Polymethacrylate VI Improver | 3.2* | 3.2** |

*57 wt. % lube oil solution of 4:21:57.5:17.5 weight ratio DMAEMA:BMA:N-MA:AMA polymethacrylate-polypropylene complex (38 wt. % polymethacrylate on a neat basis).
**38 wt. % lube oil solution of 4:21:57.5:17.5 weight ratio DMAEMA:BMA:N-MA:AMA (38 wt. % polymethacrylate on a neat basis).

The above ATF formulations were tested in the Turbohydramatic Cycling Test which is described in Dexron II Automatic Transmission Fluid Specification GM 6137-M, July 1973 of the General Motors Corp.

The test results of the above ATF fluids in the Turbohydramatic Cycling Test are reported below:

| TURBOHYDRAMATIC CYCLING TEST | |
|---|---|
| ATF Fluid | Friction Limited Life, Hrs. |
| K | 233 (average) |
| J | 311 |

As can be seen from the above, the superiority of Fluid J in Friction Limited Life demonstrates the superiority of VI representative Improver J over comparative VI Improver K.

EXAMPLE VIII

This example illustrates a synergistic effect obtained with 2 wt. % DMAEMA-containing polymethacrylate-polyalkene complex VI improvers. This improved dispersancy cannot be obtained by using either polyalkene polymerization solvent alone or by reducing the dispersant monomer content.

The dispersant VI improvers tested are as follows:

Representative complex products L and M were prepared in accordance with the procedure described in Example III. VI Improver L is a 4:21:57.5:17.5 weight ratio DMAEMA:BMA:NMA:AMA methacrylate interpolymer-polypropylene complex of an interpolymer-polypropylene complex weight ratio of 2:1. Representative VI Improver M is the same as Improver L except the interpolymer component is a 2:23:57.5:17.5 DMAEMA:BMA:NMA:AMA weight ratio methacrylate. Comparative Improvers N and O are respectively 4:21:57.5:17.5 and 2:23:57.5:17.5 weight ratio DMAEMA:BMA:NMA:AMA interpolymers polymerized in accordance with Example III with the exception mineral oil was substituted for the polypropylene reaction solvent. The neat polymethacrylate components were all essentially of the same molecular weight ($\sim 1.5 \times 10^5$).

Four motor oil fluids were prepared incorporating the above described dispersants and differing only in respect thereto and are described as follows:

| Composition, Wt. % | Motor Oil Formulations | | | |
|---|---|---|---|---|
| | L | M | N | O |
| Mineral Oil (136 SUS at 100° F.) | 84.83 | → | | |
| Zinc Dialkyldithio-phosphate | 1.34 | → | | |
| Ethyl substituted mono- and Dinonyldiphenyl-amine | 0.35 | → | | |
| Overbased Calcium Sulfonate | 1.53 | → | | |
| Ethylene-propylene Copolymer | 7.70 | → | | |
| Antifoamant | 150 ppm | → | | |
| Polymethacrylate VI Improver Lube Solution | 4.25 | → | | |

The aforegoing motor oil formulations were tested in the Bench VC Test which measures turbidity, the lower the turbidity values indicated below the better dispersancy. A brief explanation of the test is as follows:

Exact volumes of the test oil. a synthetic blowby, and a ineral oil diluent were mixed together in a test bottle. The bottle was then placed on a rocker and rocked for 4 hours at 280° F. After heating, the sample was diluted with more mineral oil, cooled to room temperature, and the turbidity was measured with a Lumetron turbidimeter equipped with a 700 mu filter. Synthetic blowby is a hydrocarbon fraction which has been oxidized under specifc conditions. This material emulates the oxidized compounds which find their way past the piston rings and into the crankcase of an internal combustion engine.

The test data resulting from the testing of the four abovedescribed motor oil formulations in the Bench VC Test are reported below:

| Fluids | BVCT Results at (wt. %) VI Improver | | | |
|---|---|---|---|---|
| | 4.25 | 3.0 | 2.0 | 1.0 |
| L | 3.0 | 7.5 | 28.0 | 34 |
| M | 3.0 | 3.5 | 7.0 | 31.5 |
| N | 8 | 10 | 24 | 45 |
| O | 3.5 | 4.0 | 28.0 | 41.0 |

As can be seen from the above for an equal polymethacrylate content on a neat basis the fluid containing representative VI Improver M is substantially superior to comparative VI Improvers N and O.

We claim:

1. A complex polymethacrylate-liquid poly(alkene-1) product of a polymethacrylate to polyalkene component weight ratio of between about 4:1 and 2:3, said liquid poly(alkene-1) of a molecular weight between about 200 and 10,000 and wherein said alkene-1 is of 3 to 12 carbons, said polymethacrylate of a molecular weight of between about $5 \times 10^4$ and $10^6$ composed of the following monomeric elements:

a. between about 1 and 10 wt. % dialkylaminoalkyl methacrylate characterized by the formula:

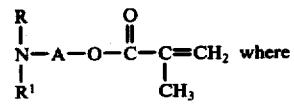

where R and $R^1$ are alkyl of from 1 to 2 carbons A is alkanediyl of from 1 to 5 carbons b. between about 15 and 30 wt. % $C_1$-$C_6$ alkyl methacrylate characterized by the formula:

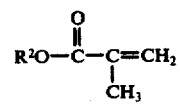

where $R^2$ is alkyl of from 1 to 6 carbons c. between about 40 and 60 wt. % of $C_{10}$-$C_{14}$ alkyl methacrylate characterized by the formula:

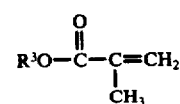

where $R^3$ is of from 10 to 14 carbons, and d. between about 15 and 30 wt. % of $C_{16}$-$C_{20}$ alkyl methacrylate characterized bythe formula:

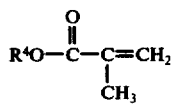

where $R^4$ is alkyl of from 16 to 20 carbons said complex product prepared by polymerizing said monomeric elements in the ratios as defined in the presence of said liquid polyalkene component.

2. A mineral oil composition comprising between about 10 and 95 wt. % mineral lubricating oil and between about 0.1 and 90 wt. % of a complex polymethacrylate-polyalkene product of a polymethacrylate component weight ratio of between about 4:1 and 2:3, said liquid poly(alkene-1) of a molecular weight between about 200 and 10,000 and wherein said alkene-1 is of 3 to 12 carbons, said polymethacrylate interpolymer of a molecular weight of between about $5 \times 10^4$ and $10^6$ composed of the following monomeric elements:

a. between about 1 and 10 wt. % dialkylaminoalkyl methacrylate characterized by the formula:

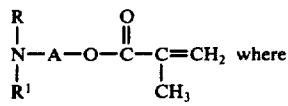

where R and $R^1$ are alkyl of from 1 to 2 carbons A is alkanediyl of from 1 to 5 carbons b. between about 15 and 30 wt. %% $C_1$-$C_6$ alkyl methacrylate characterized by the formula:

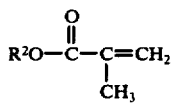

where $R^2$ is alkyl of from 1 to 6 carbons c. between about 40 and 60 wt. % of $C_{10}$-$C_{14}$ alkyl methacrylate characterized by the formula:

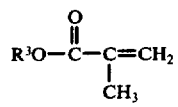

where $R^3$ is alkyl of from 10 to 14 carbons d. between about 15 and 30 wt. % of $C_{16}$-$C_{20}$ alkyl methacrylate characterized by the formula:

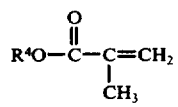

where $R^4$ is alkyl of from 16 to 20 carbons said complex product prepared by polymerizing said monomeric elements in the ratios as defined in the presence of said liquid polyalkene component.

3. A mineral lubricating oil composition in accordance with claim 2 wherein said complex product content is between about 10 and 90 wt. %.

4. A mineral lubricating oil composition in accordance with claim 2 wherein said complex product content is between about 0.1 and 10 wt. %.

5. A complex product in accordance with claim 1 wherein said poly(alkene-1) is polypropylene.

6. A mineral oil composition in accordance with claim 2 wherein said poly(alkene-1) is polypropylene.

7. A complex product in accordance with claim 1 wherein said poly(alkene-1) is poly(decene-1).

8. A mineral oil composition in accordance with claim 2 wherein said poly(alkene-1) is poly(decene-1).

* * * * *